March 18, 1924.   1,486,936
J. E. SWENDEMAN
APPARATUS FOR AUTOMATICALLY SEPARATING LIQUIDS OF DIFFERENT
SPECIFIC GRAVITIES
Filed April 29, 1920   2 Sheets-Sheet 2
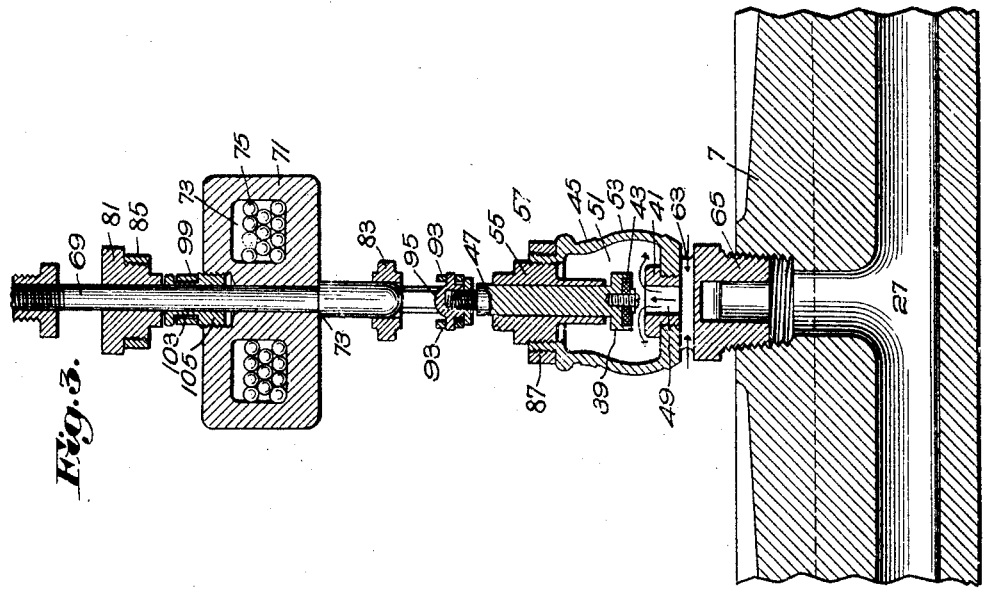
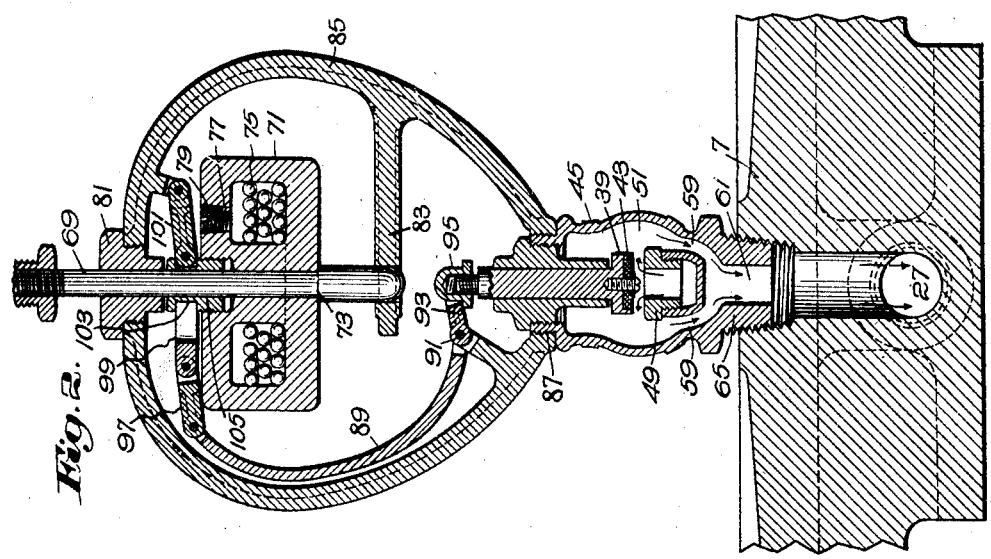
Inventor:
Joseph E. Swendeman
by Emery, Booth, Janney & Varney
Attys.

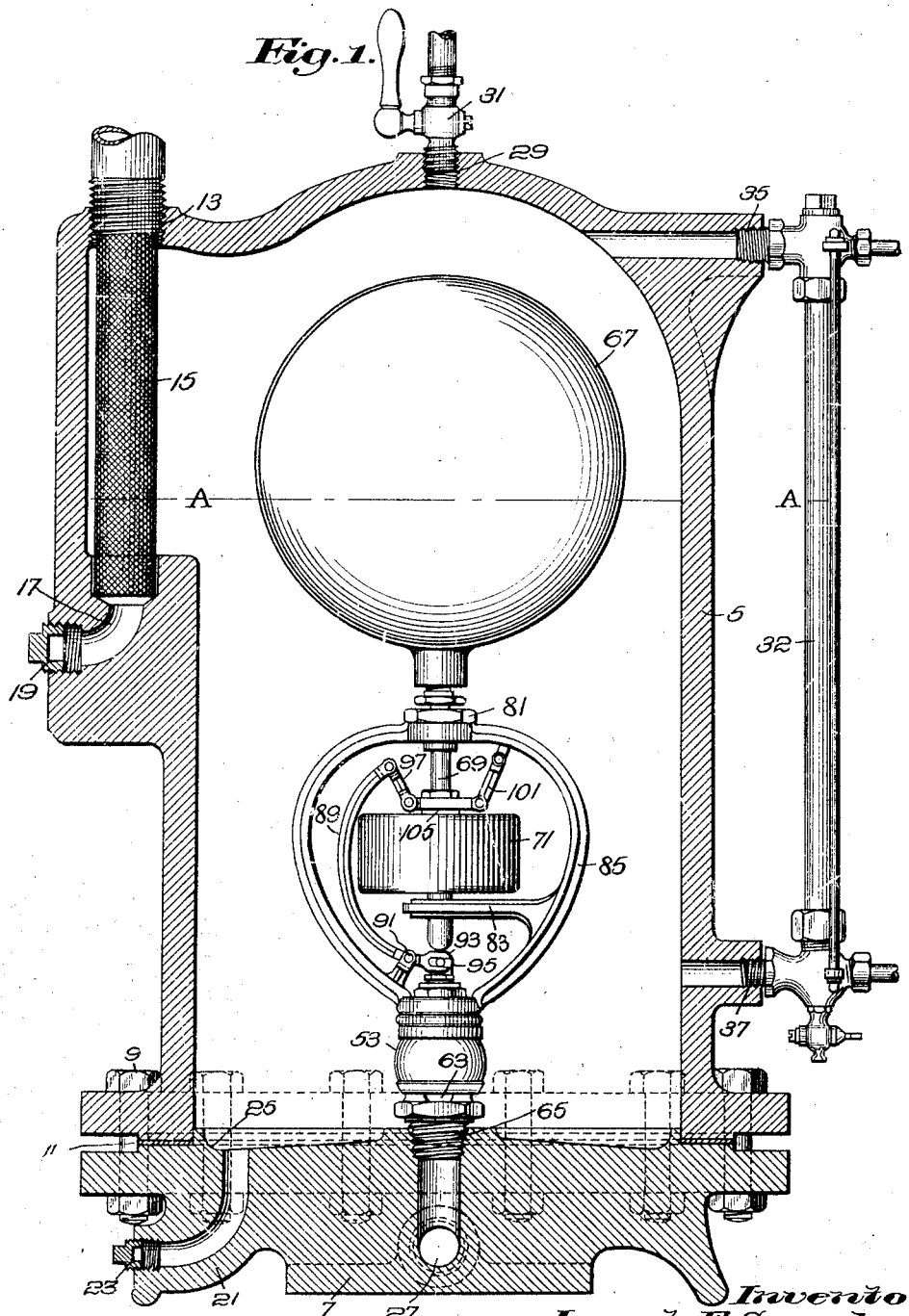

Patented Mar. 18, 1924.

1,486,936

UNITED STATES PATENT OFFICE.

JOSEPH E. SWENDEMAN, OF PHILADELPHIA, PENNSYLVANIA.

APPARATUS FOR AUTOMATICALLY SEPARATING LIQUIDS OF DIFFERENT SPECIFIC GRAVITIES.

Application filed April 29, 1920. Serial No. 377,503.

*To all whom it may concern:*

Be it known that I, JOSEPH E. SWENDEMAN, a citizen of the United States, and a resident of Philadelphia, in the county of Philadelphia and State of Pennsylvania, have invented an Improvement in Apparatus for Automatically Separating Liquids of Different Specific Gravities, of which the following description, in connection with the accompanying drawings, is a specification, like characters on the drawings representing like parts.

This invention relates to an apparatus for automatically separating liquids of different specific gravities, and will be best understood by reference to the following description, when taken in connection with the accompanying drawings of one specific embodiment thereof, while its scope will be more particularly pointed out in the appended claims:

In the drawings:

Fig. 1 is a central, vertical sectional view, partly in elevation, of a liquid separating apparatus exemplifying my invention, the parts being shown in the position which they occupy when the valve is closed;

Fig. 2 is a central, vertical sectional view, on an enlarged scale, of the valve mechanism, showing the parts in the positions which they occupy when the valve is open; and Fig. 3 is a sectional view on line 3—3 of Fig. 2.

Referring to the drawings, and to the embodiment of my invention which I have selected for exemplification, I have shown (see Fig. 1) a receptacle, herein comprising a shell or body 5 and a base 7, suitably secured together as by bolts 9, a gasket 11 being provided to maintain a tight joint between the body and the base. In the present embodiment, the receptacle is closed at the top, and the apparatus is capable of operation under pressure above that of the atmosphere.

The combined liquids, such as gasoline and water, enter the receptacle through an inlet 13, with which is preferably associated a tubular strainer 15, whose interior is in direct communication with the inlet at one end of the strainer, while the other end communicates with a sediment blow-off 17, normally closed by a suitable valve, herein a plug 19. The latter may be removed at any time, and accumulations of sediment discharged, even when the apparatus is in operation.

The base 7 is preferably provided with a drain passage 21, normally closed by a suitable valve, herein a plug 23, which may be removed to allow the contents to be drained off. Preferably, the upper side of the base is provided with a depression 25, from the lowest point of which the drain 21 leads in a downward direction, to ensure the complete emptying of the receptacle. The base is further provided with a discharge passage 27 for the heavier liquid, such as water. At a suitable point above the discharge passage 27 is an outlet passage 29 for the lighter liquid such as gasoline, and this outlet may be piped to a tank (not shown) located at any convenient height above the apparatus. A suitable valve 31 may be provided to close the outlet 29, if desired.

The intention is to maintain the dividing level between the two liquids intermediate the lower and upper outlets 27 and 29, thus ensuring at all times a liquid seal to prevent the accidental escape of the lighter liquid. This dividing level may be seen from the outside of the receptacle by providing a gage glass 32, having upper and lower connections 35 and 37, with the chamber within the receptacle.

The outflow of the heavier liquid, in the present example, is controlled by a valve 39 (see Figs. 2 and 3) cooperating with a valve seat 41, preferably having flat, cooperating surfaces, the valve being preferably provided with a renewable disk 43, suitably secured thereto, as by a screw 45 threaded into the valve. To secure the best results, the valve should be balanced, and herein I have provided the valve with a stem 47, and the valve seat with an opening 49 of equal diameter. When the valve is closed, the top of the valve stem and the bottom of the valve body are subjected to equal pressures within the receptacle. The valve is enclosed in a chamber 51 formed in the valve casing 53, the latter having a guide 55 for the valve stem. The guide is herein provided with a body 57 threaded into the valve casing, thereby to permit removal of the valve and its seat from the top of the valve casing, the seat to that end being threaded into the valve casing. The valve chamber 51 communicates by way of branch passages 59 and a main passage 61 (see Fig. 2) with the discharge passage 27, while the opening 49 in the valve seat 41 communicates by way of a horizontal passage 63 (see Fig. 3) with the interior of the receptacle. It follows that when the valve is seated, communication between the interior of the receptacle and the discharge 27 is closed, but when the valve is unseated, as shown in Figs. 2 and 3, communication is thereby established, and the heavier liquid in the receptacle flows in the course indicated by the arrows in Fig. 3 into the horizontal passage 63, thence in an upward direction through the opening 49 into the chamber 51, and thence (see Fig. 2) in a downward direction through the passages 59 and 61 into the discharge 27. The valve casing is suitably secured to the base 7, as by providing the same with a threaded shank, or nipple 65, screwed into the base.

The valve is operated by means responsive to changes in height of the dividing level of the liquids, and for this purpose, I have herein provided a suitable float 67 (see Fig. 1), appropriately connected with the valve. This connection might be direct, and in the present example, I have provided the float with a depending stem 69, which could be directly attached to the float stem 47, but I prefer to interpose between the float and the valve an appropriate multiplying connection for the purpose of furnishing an increased lifting power. In any event, the effective weight of the float and its connected parts should be such that it will sink in the lighter liquid and float in the heavier liquid. To this end, I have herein provided the float with a weight 71 carried by the float stem 69, as by providing the latter with a shoulder 73, on which the weight rests. The weight has suitable provision, whereby its mass may be varied, as by providing the weight with a chamber 73, into which lead shot 75 may be introduced through an opening 77, normally closed by a threaded plug 79 (see Fig. 2). The float stem 69 is mounted to slide in a vertical direction in upper and lower guides 81 and 83, the latter being herein formed integral with a yoke frame 85, into the upper end of which the guide 81 is threaded. This frame is suitably supported on the valve casing 53, as by providing the latter with an upwardly extending boss 87, threaded into the lower end of the frame.

In case it is desired to provide a multiplying connection between the float and valve, I prefer to employ a lever 89, fulcrumed at 91 on the frame 85, and having a forked end 93 straddling and pivoted to a cap 95, the latter being threaded onto the upper end of the valve stem 47. The longer arm of the lever is herein connected by a link 97, to one end of a sliding jaw 99, whose other end is pivotally connected by a link 101 with the frame 85. The sliding jaw in the present example, is received in the circumferential groove 103, provided in a guide consisting of a bushing 105 threaded into the weight 71. It follows that when the float rises, the valve will be correspondingly opened and closed, but the travel of the valve will be shorter than that of the float; hence, the power is multiplied, thus ensuring a factor of safety in case of unusual friction which might develop from any cause. Preferably, when the valve is closed, the float stem 69 rises on the upper end of the cap 95 on the valve stem 47, as shown in Fig. 1. This takes the strain off the connecting levers and links. To this end, the bushing 105 may be adjusted vertically with reference to the float stem 69 by turning the bushing in the proper direction with reference to the weight 71 into which it is threaded.

The general operation of the apparatus hereinbefore specifically described is as follows:

The combined liquids, such as water and gasoline, are admitted through the inlet 13 into the body 5 of the receptacle, and the heavier liquid will naturally gravitate toward the bottom of the receptacle. The dividing level between the liquids, herein represented by the line A—A, should be maintained substantially constant, and at a suitable height above the discharge passage 27. As before stated, the float should be accurately loaded, so that it will sink when submerged in lighter liquid, but will float in heavier liquid. It follows that the float cannot rise until there is a sufficient body of water surrounding it, to give it the necessary buoyancy. When the proportion of the heavier liquid tends to increase, the float will rise and open the valve, thereby allowing some of the heavier liquid to be discharged. When the dividing level A—A falls to the predetermined point, the valve will again close and maintain the seal, thus preventing anything but the heavier liquid from being emitted from the bottom of the receptacle.

Having thus described one embodiment of my invention, but without limiting myself thereto, what I claim and desire by Letters Patent to secure is:

Claims:

1. In an apparatus for automatically separating liquids of different specific gravities, the combination of a receptacle having an outlet for the heavier liquid; a float whose specific gravity is greater than that of the lighter liquid and less than that of the heavier liquid; a valve seat through which the liquid flows to said outlet; and a balanced valve which seats endwise against said valve seat and is operated by said float.

2. In an apparatus for automatically separating liquids of different specific gravities, the combination of a receptacle having an outlet for the heavier liquid; a float provided with a depending stem; a valve controlling said outlet and provided with an upstanding stem; and means connecting said stems to cause said valve stem to follow the movement of said float stem but at a reduced travel.

3. In an apparatus for separating liquids of different specific gravities, the combination of a receptacle; a valve casing within said receptacle, said casing having an interior chamber, an inlet leading from the interior of said receptacle to said chamber, and an outlet leading from said chamber to the exterior of said receptacle; a valve within said chamber and controlling the communication between said inlet and said outlet, the pressure within said receptacle being exerted endwise against said valve in a direction tending to open it into said chamber; and a float within said receptacle and tending to close said valve against said pressure.

4. In an apparatus for separating liquids of different specific gravities, the combination of a receptacle; a valve casing having an interior chamber, an inlet leading from the interior of said receptacle to said chamber, and a valve seat presenting an outlet leading from said chamber to the exterior of said receptacle; a valve within said chamber and cooperating with said seat to control the communication between said inlet and said outlet, said valve having two substantially equal areas, both subject to the pressure within said receptacle and one seating endwise against said seat; and a float within said receptacle and controlling said valve.

5. In an apparatus for separating liquids of different specific gravities, the combination of a receptacle presenting an outer chamber; a valve casing within said chamber, said casing presenting an inner chamber, an inlet leading from the said outer chamber to said inner chamber, and an outlet leading from said inner chamber to the exterior of said receptacle; a valve within said inner chamber, controlling the communication between said inlet and said outlet and, when closed, preventing the admission of liquid from said outer chamber to said inner chamber; a valve seat against which said valve rests endwise when it is closed and from which it recedes when it opens; and a float within said outer chamber and controlling said valve.

6. In an apparatus for separating liquids of different specific gravities, the combination of a receptacle presenting an outer chamber; a valve casing within said chamber, said casing presenting an inner chamber, an inlet leading from the said outer chamber to said inner chamber, and an outlet leading from said inner chamber to the exterior of said receptacle; a valve within said inner chamber, controlling the communication between said inlet and said outlet and, when closed, preventing the admission of liquid from said outer chamber to said inner chamber; a valve seat against which said valve rests endwise when it is closed and from which it recedes when it opens, said valve, when closed, having two substantially equal areas, both subject to the pressure within said outer chamber; and a float within said outer chamber and controlling said valve.

7. In an apparatus for separating liquids of different specific gravities, the combination of a receptacle presenting an outer chamber having an inlet for the combined liquids, an upper outlet for the lighter liquid and a lower outlet for the heavier liquid; a valve casing within said chamber above said lower outlet, said casing presenting an inner chamber, an inlet leading laterally from said outer chamber and upwardly to said inner chamber, and an outlet leading downwardly from said inner chamber to said lower outlet; a valve within said inner chamber, controlling the communication between said chambers; an upwardly presented valve seat against which said valve seats endwise and from which said valve recedes in an upward direction when it opens; and a float within said outer chamber and controlling said valve.

8. In an apparatus for handling liquids, the combination of a receptacle having an outlet for the liquid; a float within said receptacle; a valve seat through which the liquid flows to said outlet; and a float-controlled, balanced valve which seats endwise against said seat and, when seated, has its area within said seat exposed to the pressure within said receptacle.

9. In an apparatus for handling liquids, the combination of a receptacle for the liquids; a valve casing having a chamber, an outlet therefrom, and a valve seat presenting an inlet from said receptacle to said chamber; a valve in said chamber seated endwise against said seat and extending through said casing into said receptacle; and a float within said receptacle and connected to said valve.

In testimony whereof, I have signed my name to this specification.

JOSEPH E. SWENDEMAN.